United States Patent Office 3,039,360
Patented June 19, 1962

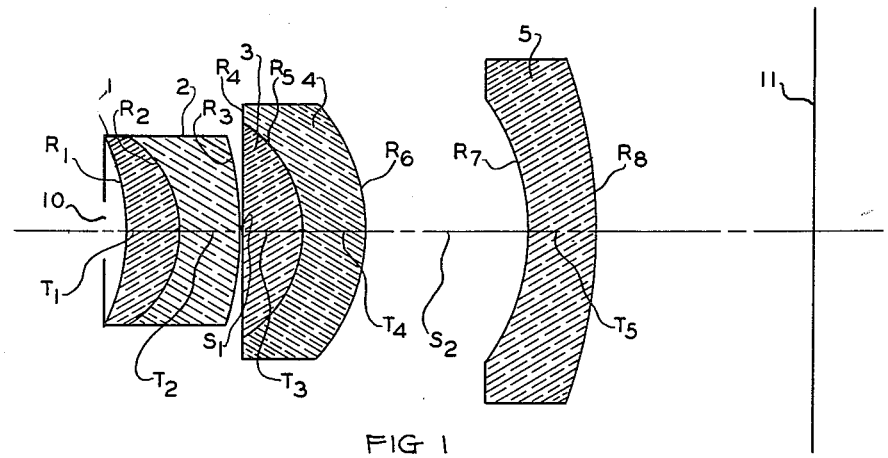
FIG 1
| FOCAL LENGTH F=0.630 IN. RELATIVE APERTURE f/8 | | | | | | |
|---|---|---|---|---|---|---|
| LENS | $N_D$ | V | RADII (IN.) | THICKNESS (IN.) | CLEAR APERTURE (IN) | DIAMETER (INCHES) |
| 1 | 1.617 | 54.9 | $R_1 = -1.005$<br>$R_2 = -0.1829$ | $T_1 = 0.100$ | 0.184 | 0.309 |
| 2 | 1.649<br>AIR | 33.8 | $R_3 = -0.6297$ | $T_2 = 0.080$<br>$S_1 = 0.001$ | | |
| 3 | 1.617 | 54.9 | $R_4 = +5.190$<br>$R_5 = -0.1876$ | $T_3 = 0.100$ | 0.274 | 0.399 |
| 4 | 1.649<br>AIR | 33.8 | $R_6 = -0.3210$ | $T_4 = 0.100$<br>$S_2 = 0.250$ | | |
| 5 | 1.620 | 60.3 | $R_7 = -0.2918$<br>$R_8 = -0.8475$ | $T_5 = 0.100$ | 0.408 | 0.533 |
FIG 2
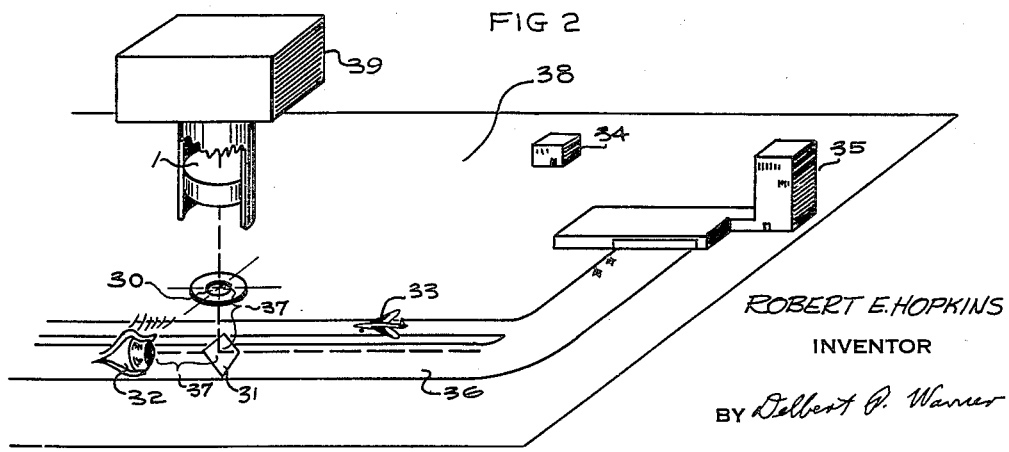
FIG 3
ROBERT E. HOPKINS
INVENTOR
BY Delbert P. Warner
ATTORNEY

3,039,360
LENS WITH REMOTE ENTRANCE PUPIL
Robert E. Hopkins, Rochester, N.Y., assignor to General Precision, Inc., a corporation of Delaware
Filed Mar. 17, 1958, Ser. No. 721,788
6 Claims. (Cl. 88—57)

The present invention relates to optics, and particularly to an optical objective lens having a remote entrance pupil.

The invention has particular utility to situations in which the lens must be brought close to the object. Such a requirement may be found in systems in which the entrance pupil simulates the viewpoint of an observer, and in which the simulated viewpoint must approach very closely to a model.

It is an object, therefore, of this invention to produce a lens having a remote entrance pupil located near the first element of the lens, and preferably in front thereof.

It is a further object of this invention to produce a lens having a remote entrance pupil which has relatively small dimensions and which may be employed at short distances from its subject.

It is still a further object of this invention to provide a lens having a remote entrance pupil in which the entrance pupil may be employed along with a small mirror in such a way as to bring the simulated viewpoint very close to the surface of an extended object.

It is yet another object of this invention to provide an objective lens capable of producing images of good quality while employing an image limiting diaphragm outside the lens.

Still other objects of the invention will become apparent to those skilled in the art to which the invention is directed when they read the disclosure, of which the following figures are a part:

FIG. 1 is an axial section of a lens having a remote entrance pupil;

FIG. 2 is a chart giving constructional details of one embodiment of the invention; and FIG. 3 is a perspective of a part of a particular system which illustrates one mode of use of the invention.

The lens illustrated in the figures and described in the accompanying specification is designed to have a remote entrance pupil which makes possible its use to simulate a viewpoint in an optical system in which small scale models are used as the objects. The entrance pupil serves to limit the size of the cone of rays permitted to enter the lens from any given object.

According to the figures, an objective lens having a remote entrance pupil is shown in FIG. 1, with the entrance pupil at 10 and the image plane at 11. The numbers 1, 2, 3, 4 and 5 refer to the separate lens elements, the properties of which are set forth in FIG. 2. The values $R_1$, $R_2$, $R_3$, $R_4$, $R_5$, $R_6$, $R_7$ and $R_8$ represent the radii of curvature of the respective faces of the lens elements. These radii are set forth in detail in FIG. 2 in which a negative radius of curvature indicates that the concave faces of the lenses are directed towards the front of the objective lens which is on the left side of FIG. 1. The designations $T_1$, $T_2$, $T_3$, $T_4$ and $T_5$, as set forth in FIGS. 1 and 2 designate the thickness of the lens elements through their respective axes. The designations $S_1$ and $S_2$ refer simply to thickness of air space between the respective elements. The clear aperture in inches and the diameter in inches of the three composite lenses are set forth in FIG. 2.

A table of values for elements included in the instant invention may be expressed as follows:

[Focal length F=0.630 in. Relative aperature f/8]

| Lens | $N_D$ | V | Radii (In.) | Thickness (In.) | Clear Aperture (In.) | Diameter (Inches) |
|---|---|---|---|---|---|---|
| 1 | 1.617 | 54.9 | $R_1 = -1.005$ | $T_1 = 0.100$ | 0.184 | 0.309 |
| 2 | 1.649 | 33.8 | $R_2 = -0.1829$ | $T_2 = 0.080$ | | |
| | | | $R_3 = -0.6297$ | | | |
| | Air | | | $S_1 = 0.001$ | | |
| 3 | 1.617 | 54.9 | $R_4 = +5.190$ | $T_3 = 0.100$ | 0.274 | 0.399 |
| | | | $R_5 = -0.1876$ | | | |
| 4 | 1.649 | 33.8 | $R_6 = -0.3210$ | $T_4 = 0.100$ | | |
| | Air | | | $S_2 = 0.250$ | | |
| 5 | 1.620 | 60.3 | $R_7 = -0.2918$ | $T_5 = 0.100$ | | |
| | | | $R_8 = -0.8475$ | | 0.408 | 0.533 |

In this table F represents the focal length of the complete lens in inches, $f$ represents the relative aperature, $N_D$ represents the index of refraction, V represents the dispersion ratio, $R_1$ through $R_8$ represent the radii of curvature of the faces of the lens elements in inches, $T_1$ through $T_5$ represent the thicknesses of the lens elements in inches, $S_1$ and $S_2$ represent the thickness of air between the lens elements, and the clear aperture in inches and the diameter in inches are expressed in full.

One use of this invention is illustrated in FIG. 3, in which 1 represents the first element of a lens such as that illustrated above in FIG. 1, 30 represents the remote entrance pupil of such a lens, 31 represents a mirror and 32 the eye of an observer. It is apparent that the image of a figure such as objects 33, 34 or 35 would be reflected from the mirror 31 through the entrance pupil 30 into the lens 1 with this arrangement, where the distance 37 from the center of the mirror 31 to the entrance pupil 30 is equal to the distance 37 from the center of the mirror to the lens of the eye 32.

The arrangement of FIG. 3 is such that it is possible to approach the face of a small scale model within a fraction of an inch and still employ a lens having good resolution characteristics such as that of the lens in FIG. 1. The lens is able, with this construction, to transmit an image of good quality to a television camera or other apparatus of substantial size, indicated at 39, which can not be brought close to the surface 38. This system has been illustrated in greater detail in connection with an application assigned to the same assignee by Dr. Robert A. Woodson, filed on March 17, 1958, and given Serial No. 721,758.

This lens has the great advantage that it permits the simulated viewpoint, required with very small models, to approach closer to the model than is otherwise possible.

This invention also makes it possible to use a mirror effectively to fold the optical path and thus approach very close to a small scale model when the lens is associated with relatively large apparatus. In this connection it may be stated, that the closer the mirror is to the entrance pupil the smaller may be the physical size of the mirror which folds the optical path. Thus, by having a remote entrance pupil and a path-folding mirror substantially coincident with it as shown in FIG. 3, the size of a mechanical structure in front of the lens is minimized and hence we minimize the simulated eye height at which the lens and mirror combination begins to physically interfere with the airport model.

Another advantage of this invention is that it provides a combination of lens elements which together make it possible to get good image quality, while the entrance pupil is determined by an aperture placed in a chosen position outside the lens.

It will be recognized, of course, that the characteristics and relationship of the lens as set forth in the figures and accompanying specification are exemplary only, and that the various values of radius, lens thickness, type of glass and the like might be changed considerably and still fall within the scope of applicant's invention.

I claim as my invention:

1. An optical objective lens comprising five elements combined in three components, the first and second elements comprising concavo-convex lenses joined to form the first component, said first component having a negative first radius of curvature substantially equal to one and three-fifths times the focal length of the objective lens and a negative second radius of curvature substantially equal to the focal length of the objective lens, the third and fourth elements comprising a double convex lens and a concavo-convex lens joined to form the second component, the third component including a positive first radius of curvature substantially equal to eight times the focal length of the objective lens and a negative second radius of curvature substantially equal to one-half the focal length of the objective lens, a first air space between said first and second components of about one six-hundredth of the focal length of the objective lens, the fifth element forming the third component and comprising a concavo-convex lens having negative radii of curvature including a first radius substantially one-half as large as the focal length of the objective lens and a second radius substantially one and one-third times as large as the focal length of the objective lens, and a second air space between said second and third components, said second air space occupying a linear distance substantially equal to two-fifths of the focal length of the objective lens, whereby efficient transmission of light rays is provided when the bundle of transmitted rays is determined by an entrance pupil located outside the first component of said lens.

2. An optical objective lens comprising five elements combined in three components, the first and second elements comprising concavo-convex lenses joined to form the first component, said first element consisting of a concavo-convex lens having a negative first radius of curvature substantially equal to one and three-fifths times the focal length of the objective lens and a negative second radius of curvature substantially equal to three-tenths of the focal length of the objective lens, said second element consisting of a concavo-convex lens having a negative first radius of curvature substantially equal in length to three-tenths of the focal length of the objective lens and a negative second radius of curvature substantially equal to the focal length of the objective lens, the third element comprising a double convex lens having a positive first radius of curvature substantially equal to eight times the focal length of the objective lens and a negative second radius of curvature substantially equal to three-tenths of the focal length of the objective lens, the fourth element comprising a concavo-convex lens having a negative first radius of curvature substantially equal to three-tenths of the focal length of the lens and a negative second radius of curvature substantially equal to one-half the focal length of the objective lens, means joining said third and fourth elements to form the second component, a first air space between said first and second components of about one six-hundredth of the focal length of the objective lens, the fifth element comprising a concavo-convex lens, the negative radii of curvature of said fifth element comprising a first radius substantially one-half as large as the focal length of the objective lens and a second radius substantially one and one-third times as large as the focal length of the objective lens, said third component comprising the fifth element, and a second air space between said second and third components, said second air space occupying a linear distance substantially equal to two-fifths of the focal length of the objective lens whereby efficient transmission of light rays is provided when the bundle of transmitted rays is determined by an entrance pupil located outside the first component of said lens.

3. An optical objective lens comprising five elements combined in three components, the first and second elements comprising concavo-convex lenses having negative radii of curvature and being joined to form the first component, the radii of curvature of the object and image sides of said first component having magnitudes substantially equal respectively to 1.6 times and one times the focal length of the objective lens, the third element comprising a double convex lens, the fourth element comprising a concavo-convex lens having negative radii of curvature, means joining said third and fourth elements to form the second component, the radii of curvature of the object and image sides of said second component having magnitudes substantially equal respectively to 8.2 times and 0.3 times the focal length of the objective lens, a first air space between said first and second components, said first air space consisting of a distance of about 0.0016 of the focal length of the lens, the fifth element comprising a concavo-convex lens having negative radii of curvature, said third component comprising the fifth element, the radii of curvature of the object and image sides of said third component having magnitudes substantially equal respectively to 0.46 times and 1.34 times the focal length of the objective lens, and a second air space between said second and third components, said second air space having a width substantially equal to 0.40 times the focal length of the objective lens, whereby aberrations are minimized for rays limited by an entrance pupil located outside the first component of said lens.

4. An optical objective lens having a focal length of substantially 0.630 inch comprising five elements combined in three components, the first and second elements comprising concavo-convex lenses having negative radii of curvature and being joined to form the first component, the radii of curvature of the object and image sides of said first component having magnitudes substantially equal respectively to 1.6 times and one times the focal length of the objective lens, the third element comprising a double convex lens, the fourth element comprising a concavo-convex lens having negative radii of curvature, means joining said third and fourth elements to form the second component, the radii of curvature of the object and image sides of said second component having magnitudes substantially equal respectively to 8.2 times and 0.3 times the focal length of the objective lens, a first air space between said first and second components, said first air space consisting of a distance of about 0.0016 of the focal length of the lens, the fifth element comprising a concavo-convex lens having negative radii of curvature, said third component comprising the fifth element, the radii of curvature of the object and image sides of said third component having magnitudes substantially equal respectively to 0.46 times and 1.34 times the focal length of the objective lens, and a second air space between said second and third components, said second air space having a width substantially equal to 0.40 times the focal length of the objective lens, whereby aberrations are minimized for rays limited by an entrance pupil located outside the first component of said lens.

5. An objective lens having substantially the following numerical data:

[Focal length F=0.630 in. Relative aperture f/8]

| Lens | $N_D$ | V | Radii (In.) | Thickness (In.) |
|---|---|---|---|---|
| 1 | 1.617 | 54.9 | $R_1=-1.005$ | $T_1=0.100$ |
|   |       |      | $R_2=-0.1829$ |           |
| 2 | 1.649 | 33.8 |               | $T_2=0.080$ |
|   |       |      | $R_3=-0.6297$ |           |
|   | Air   |      |               | $S_1=0.001$ |
|   |       |      | $R_4=+5.190$ |           |
| 3 | 1.617 | 54.9 |               | $T_3=0.100$ |
|   |       |      | $R_5=-0.1876$ |           |
| 4 | 1.649 | 33.8 |               | $T_4=0.100$ |
|   |       |      | $R_6=-0.3210$ |           |
|   | Air   |      |               | $S_2=0.250$ |
|   |       |      | $R_7=-0.2918$ |           |
| 5 | 1.620 | 60.3 |               | $T_5=0.100$ |
|   |       |      | $R_8=-0.8475$ |           | wherein $R_1 \ldots R_8$ are the values of the radii of curvature of the refractive surfaces counted from the front to the rear of the objective, said values bearing the positive sign + when the convexity is directed to the front of the lens, and bearing the sign — when the convexity is directed to the rear, thickness indicating the axial thickness T of the lens elements and the thickness S of the air space between the lens elements, and $N_D$ and V being respectively the values of the index of refraction and the dispersion ratios or Abbe numbers of the lens materials of the several elements.

6. An objective lens having substantially the following numerical data:

[Focal length F=0.630 in. Relative aperture f/8]

| Lens | $N_D$ | V | Radii (In.) | Thickness (In.) | Clear Aperture (In.) | Diameter (Inches) |
|---|---|---|---|---|---|---|
| 1 | 1.617 | 54.9 | $R_1=-1.005$ | $T_1=0.100$ | 0.184 | 0.309 |
|   |       |      | $R_2=-0.1829$ |           |       |       |
| 2 | 1.649 | 33.8 |               | $T_2=0.080$ |       |       |
|   |       |      | $R_3=-0.6297$ |           |       |       |
|   | Air   |      |               | $S_1=0.001$ |       |       |
|   |       |      | $R_4=+5.190$ |           |       |       |
| 3 | 1.617 | 54.9 |               | $T_3=0.100$ | 0.274 | 0.399 |
|   |       |      | $R_5=-0.1876$ |           |       |       |
| 4 | 1.649 | 33.8 |               | $T_4=0.100$ |       |       |
|   |       |      | $R_6=-0.3210$ |           |       |       |
|   | Air   |      |               | $S_2=0.250$ |       |       |
|   |       |      | $R_7=-0.2918$ |           |       |       |
| 5 | 1.620 | 60.3 |               | $T_5=0.100$ | 0.408 | 0.533 |
|   |       |      | $R_8=-0.8475$ |           |       |       | wherein $R_1 \ldots R_8$ are the values of the radii of curvature of the refractive surfaces counted from the front to the rear of the objective, said values bearing the positive sign + when the convexity is directed to the front of the lens and bearing the sign — when the convexity is directed to the rear, thickness indicating the axial thickness T of the lens elements and the thickness S of the air space between the lens elements, and $N_D$ and V being respectively the values of the index of refraction and the dispersion ratios or Abbe numbers of the lens materials of the several elements.

References Cited in the file of this patent

UNITED STATES PATENTS

| 940,894 | Rohr | Nov. 23, 1909 |
| 1,053,128 | Gray | Feb. 11, 1913 |
| 1,939,098 | Berek | Dec. 12, 1933 |
| 2,267,832 | McCarthy | Dec. 30, 1941 |
| 2,363,788 | Gottlieb | Nov. 28, 1944 |
| 2,760,406 | Berger | Aug. 28, 1956 |

FOREIGN PATENTS

| 449,434 | Great Britain | June 26, 1936 |
| 650,907 | Germany | Oct. 5, 1937 |